US012764579B2

(12) United States Patent
Fujishiro

(10) Patent No.: US 12,764,579 B2
(45) Date of Patent: Oct. 13, 2026

(54) COMMUNICATION CONTROL METHOD

(71) Applicant: KYOCERA CORPORATION, Kyoto (JP)

(72) Inventor: Masato Fujishiro, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 328 days.

(21) Appl. No.: 18/410,461

(22) Filed: Jan. 11, 2024

(65) Prior Publication Data

US 2024/0147282 A1 May 2, 2024

Related U.S. Application Data

(63) Continuation of application No. PCT/JP2022/026941, filed on Jul. 7, 2022.

(30) Foreign Application Priority Data

Jul. 12, 2021 (JP) ................................ 2021-115338

(51) Int. Cl.
*H04W 24/10* (2009.01)
*H04W 74/0808* (2024.01)

(52) U.S. Cl.
CPC ....... *H04W 24/10* (2013.01); *H04W 74/0808* (2013.01)

(58) Field of Classification Search
CPC . H04W 24/10; H04W 74/0808; H04W 16/26; H04W 24/00
See application file for complete search history.

(56) References Cited

U.S. PATENT DOCUMENTS

| | | | | |
|---|---|---|---|---|
| 10,555,193 | B2 | 2/2020 | Matsumoto et al. | |
| 10,841,823 | B2 | 11/2020 | Harada et al. | |
| 11,228,927 | B2 | 1/2022 | Matsumoto et al. | |
| 11,910,211 | B2 | 2/2024 | Matsumoto et al. | |
| 2019/0124690 | A1 * | 4/2019 | Siomina | H04W 24/10 |
| 2021/0289553 | A1 * | 9/2021 | Ozturk | H04W 74/085 |

FOREIGN PATENT DOCUMENTS

| | | | |
|---|---|---|---|
| JP | WO2016/017328 | A1 | 6/2017 |
| JP | 2018-137756 | A | 8/2018 |

OTHER PUBLICATIONS

3rd Generation Partnership Project; Technical Specification Group Radio Access Network; NR; NR and NG-RAN Overall Description; Stage 2 (Release 16); 3GPP TS 38.300 V16.5.0; Mar. 2021; pp. 1-151.

* cited by examiner

*Primary Examiner* — Chuong A Ngo
(74) *Attorney, Agent, or Firm* — Studebaker Brackett PLLC

(57) ABSTRACT

In a first aspect, a communication control method is used in a cellular communication system. The communication control method includes performing, at a relay node, Listen Before Talk (LBT). The communication control method includes storing the number of successes and a failure rate in a downlink direction of the performed LBT in a memory as statistical information, and storing the number of successes and a failure rate in an uplink direction of the performed LBT in the memory as statistical information. The communication control method includes transmitting, at the relay node, the statistical information to an upper node of the relay node.

15 Claims, 9 Drawing Sheets

COMMUNICATION CONTROL METHOD

RELATED APPLICATIONS

The present application is a continuation based on PCT Application No. PCT/JP2022/026941, filed on Jul. 7, 2022, which claims the benefit of Japanese Patent Application No. 2021-115338 filed on Jul. 12, 2021. The content of which is incorporated by reference herein in their entirety.

TECHNICAL FIELD

The present disclosure relates to a communication control method used in a cellular communication system.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.5.0(2021-03)") is being considered. One or more relay nodes are involved in communication between a base station and a user equipment and perform relay for the communication.

SUMMARY

In a first aspect, a communication control method is used in a cellular communication system. The communication control method includes performing, at a communication apparatus, Listen Before Talk (LBT). The communication control method includes, at the communication apparatus, storing the number of successes and a failure rate in a downlink direction of the performed LBT in a memory as statistical information, and storing the number of successes and a failure rate in an uplink direction of the performed LBT in the memory as the statistical information. The communication control method includes transmitting, at the communication apparatus, the statistical information to an upper node of the communication apparatus.

In a second aspect, a communication control method is used in a cellular communication system. The communication control method includes, at a communication apparatus, performing LBT, and storing statistical information in a memory. The communication control method includes detecting, at the communication apparatus, a predetermined event. The communication control method includes, at the communication apparatus, transmitting a first Radio Link Failure (RLF) report to an upper node of the communication apparatus when the predetermined event is caused by an LBT failure that is the statistical information, and not transmitting the first RLF report to the upper node when the predetermined event is caused by the statistical information other than the LBT failure.

DESCRIPTION OF EMBODIMENTS

A cellular communication system in an embodiment is described with reference to the drawings. In the description of the drawings, the same or similar parts are denoted by the same or similar reference signs.

Configuration of Cellular Communication System First, a configuration example of the cellular communication system in an embodiment is described. In an embodiment, a cellular communication system is a 3GPP 5G system. Specifically, a radio access scheme in the cellular communication system is New Radio (NR) being a 5G radio access scheme. Note that Long Term Evolution (LTE) may be at least partially applied to the cellular communication system. A future cellular communication system such as the 6G may be applied to the cellular communication system.

Figure 1:
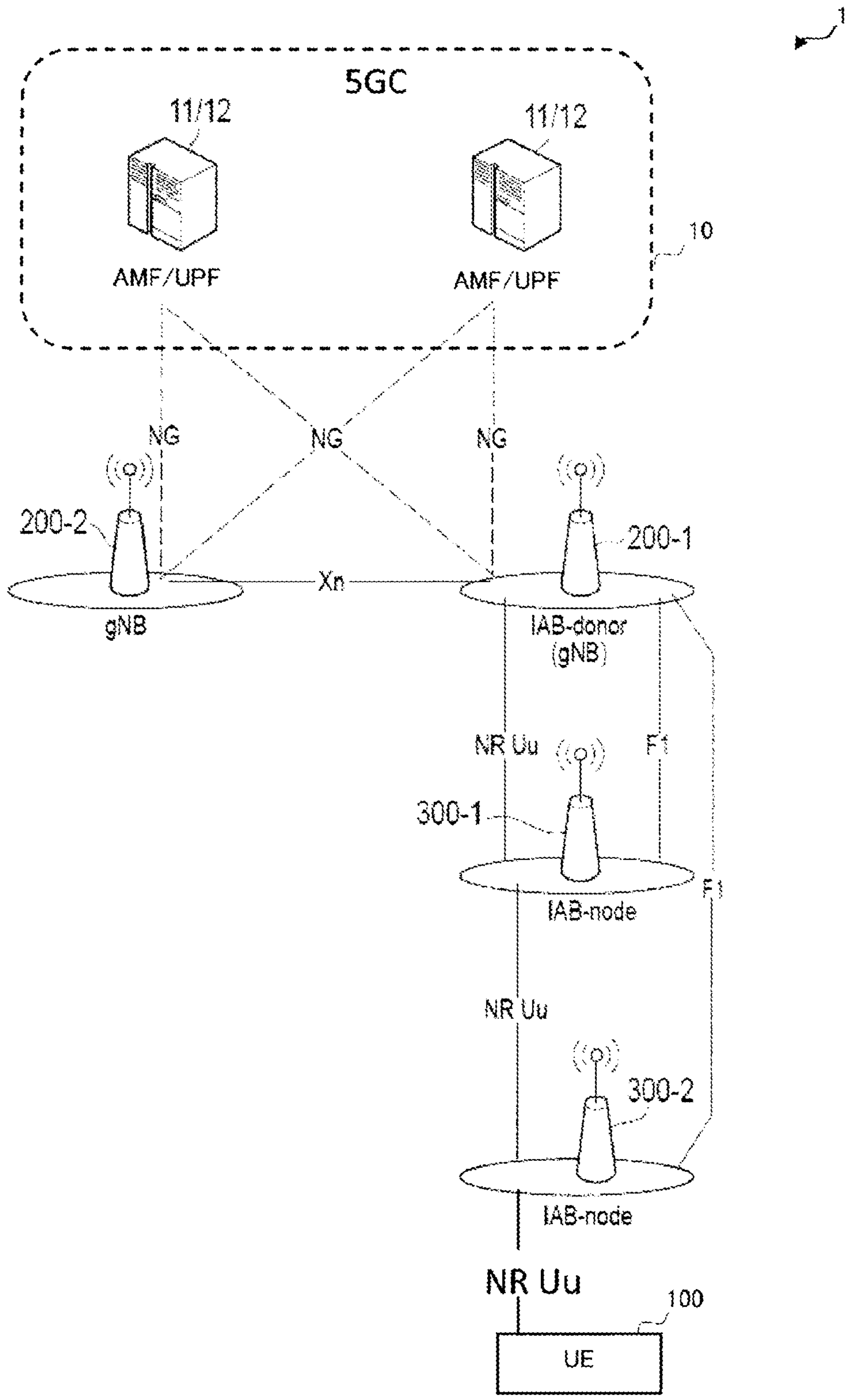
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a next generation Node B (gNB).

An example in which the base station 200 is an NR base station is mainly described below, but the base station 200 may also be an LTE base station (i.e., an evolved Node B (eNB)).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. Hereinafter, a "cell" may be used without being distinguished from a base station such as the gNB 200. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses New Radio (NR) for the backhaul to enable wireless relay of the NR access. The donor gNB (or the donor node, hereinafter also referred to as the "donor node" in some cases) 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul links.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 includes a mobile phone terminal, or a tablet terminal, a laptop PC, a sensor or an apparatus that is provided in a sensor, a vehicle or an apparatus that is provided in a vehicle, and an unmanned aircraft or an apparatus provided in an unmanned aircraft. The UE 100 is wirelessly connected to the IAB node 300 or the gNB 200 via an access link FIG. 1 illustrates an example in which the UE 100 is wirelessly connected to the IAB node 300-2. The UE 100 indirectly communicates with the donor node 200-1 via the IAB node 300-2 and the IAB node 300-1. FIG. 1 illustrates an example in which the IAB node 300-2 and the IAB node 300-1 function as relay nodes.

Figure 2:
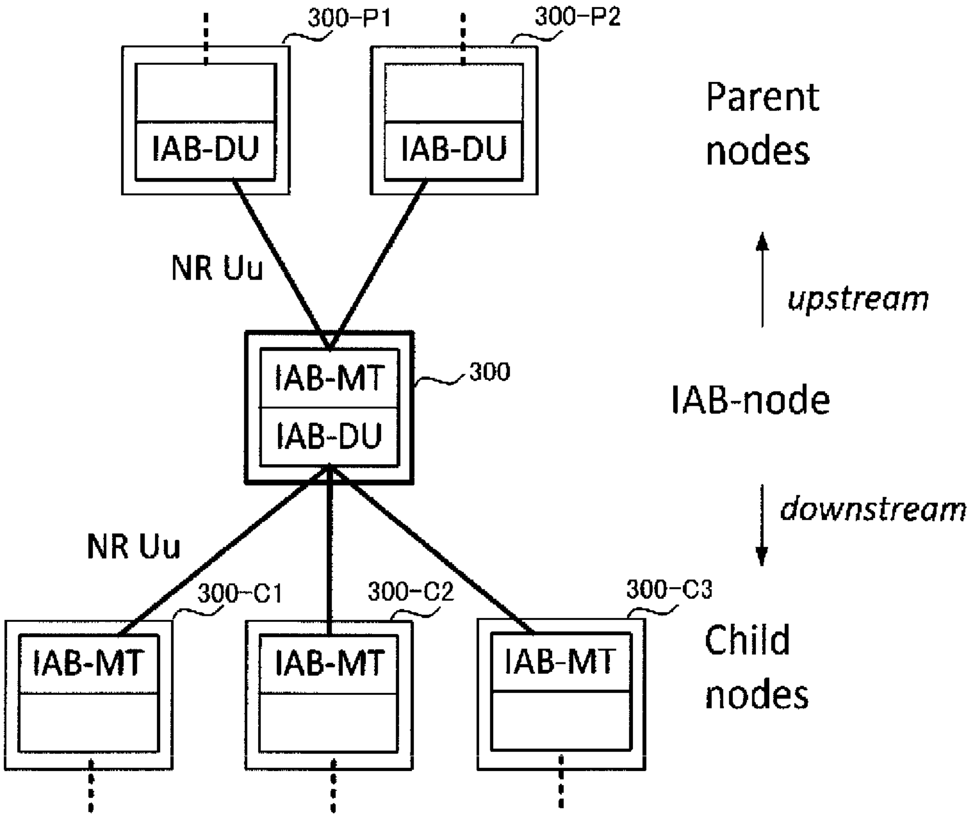
FIG. 2 is a diagram illustrating a relationship between an IAB node, Parent nodes, and Child nodes according to an embodiment.

FIG. 2 is a diagram illustrating a relationship between the IAB node 300, Parent nodes, and Child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link) FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All of the IAB nodes 300 connected to the donor node 200 via one or more hops form a Directed Acyclic Graph (DAG) topology (which may be referred to as "topology" below) rooted at the donor node 200. In this topology, the neighboring nodes of the IAB-DU in the interface are child nodes, and the neighboring nodes of the IAB-MT in the interface are parent nodes as illustrated in FIG. 2. The donor node 200 performs, for example, centralized management on resources, topology, and routes of the IAB topology. The donor node 200 is a gNB that provides network access to the UE 100 via a network of backhaul links and access links.

Configuration of Base Station

Figure 3:
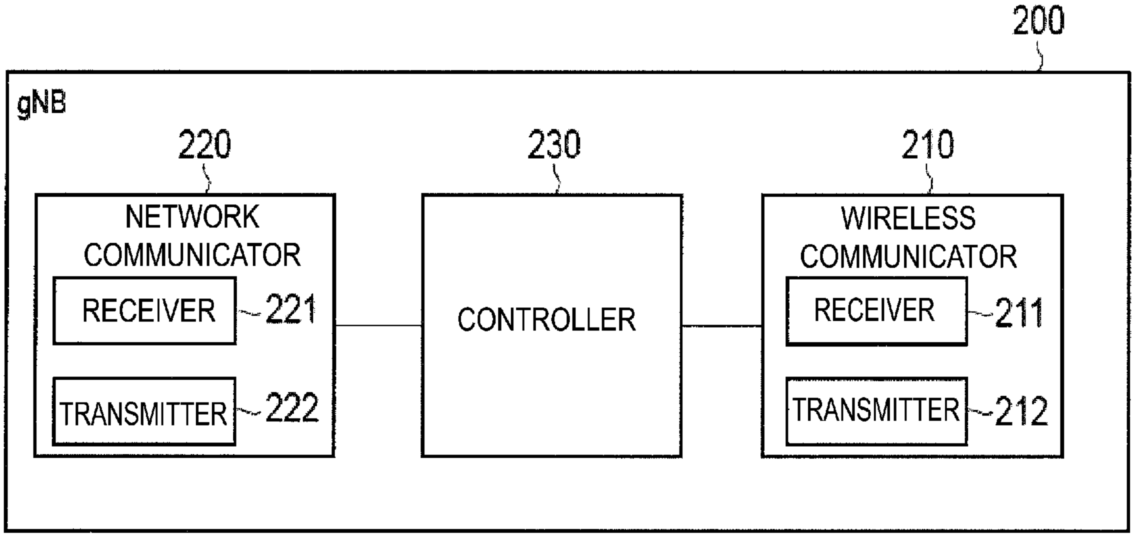
FIG. 3 is a diagram illustrating a configuration example of a gNB (donor node) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then transmitted to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each embodiment described below, the controller 230 may perform each processing operation in the gNB 200 (or the donor node 200).

Configuration of Relay Node

Figure 4:
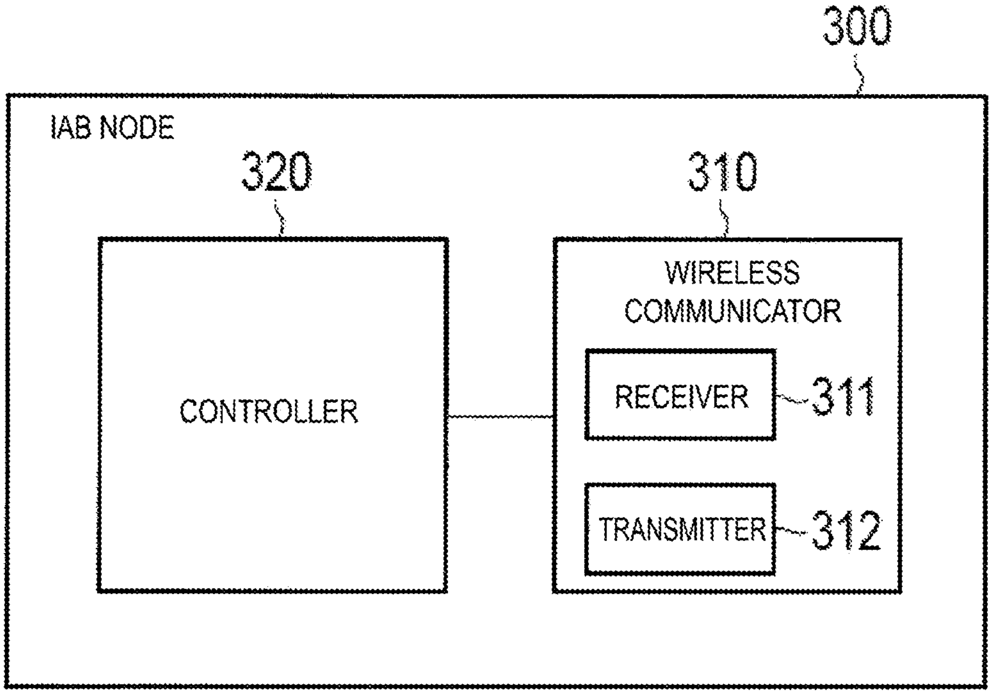
FIG. 4 is a diagram illustrating a configuration example of an IAB node (relay node) according to an embodiment.

A configuration of the IAB node 300 that is a relay node (or a relay node apparatus, which is also referred to as a relay node below in some cases) in the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link) The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then transmitted to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 320 may perform each processing operation in the IAB node 300 in each embodiment described below.

Configuration of User Equipment

Figure 5:
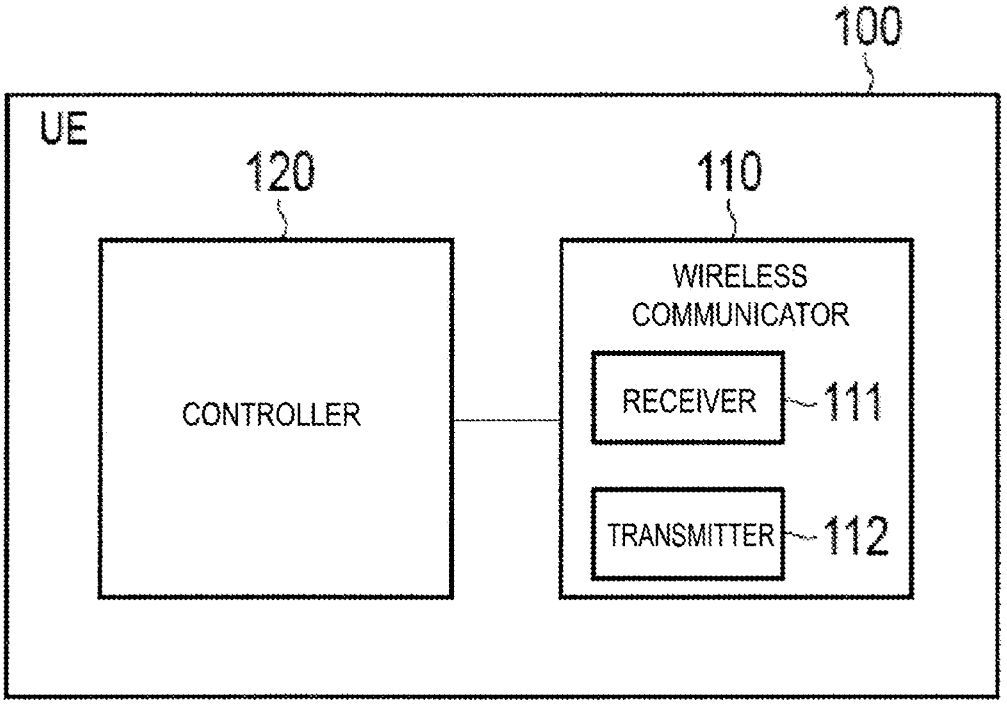
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 120 may perform each processing operation in the UE 100 in each embodiment described below.

Configuration of Protocol Stack

Figure 6:
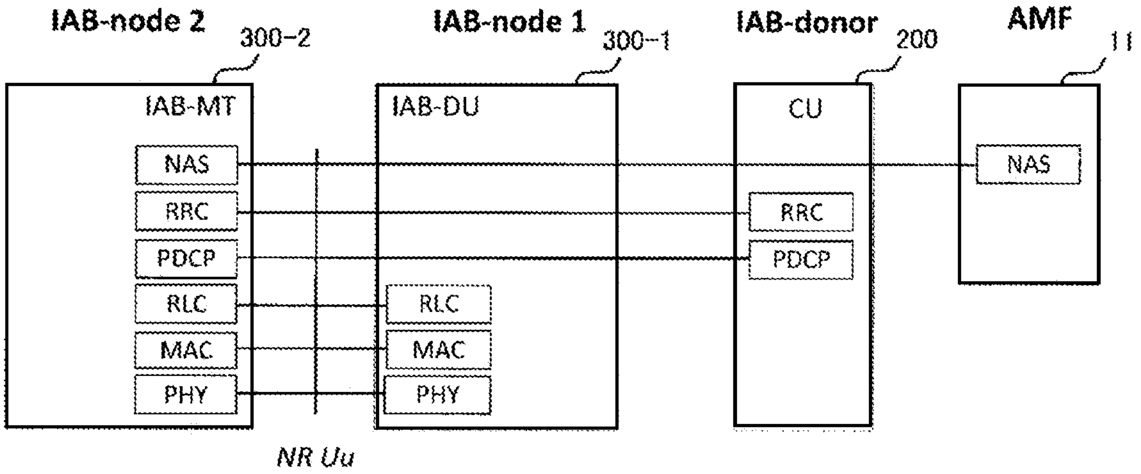
FIG. 6 is a diagram illustrating an example of a protocol stack related to a Radio Resource Control (RRC) connection and a Non-Access Stratum (NAS) connection of an IAB-MT according to an embodiment.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, Modulation and Coding Schemes (MCSs)) in the uplink and the downlink and resource blocks to be allocated.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the CU of the donor node 200 via a radio bearer.

The RRC layer controls a logical channel, a transport channel, and a physical channel according to establishment, re-establishment, and release of a radio bearer. RRC signaling for various configurations is transmitted between the RRC layer of the IAB-MT of the IAB node 300-2 and the RRC layer of the CU of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned upper than the RRC layer performs session management, mobility management, and the like. NAS signaling is transmitted between the NAS layer of the IAB-MT of the IAB node 300-2 and the NAS layer of the AMF 11.

Figure 7:
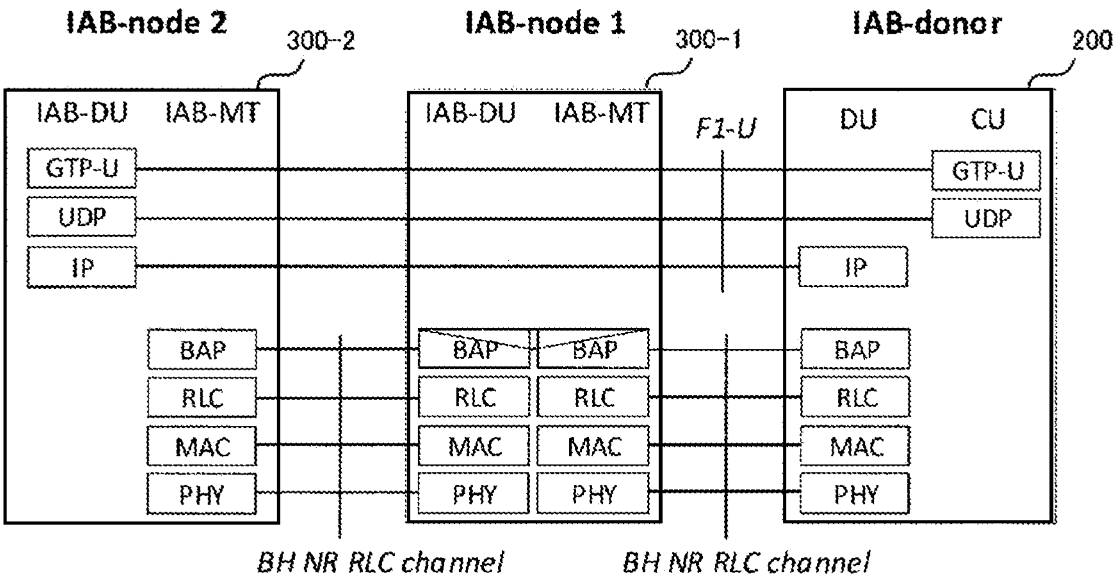
FIG. 7 is a diagram illustrating an example of a protocol stack related to an F1-U protocol according to an embodiment.
Figure 8:
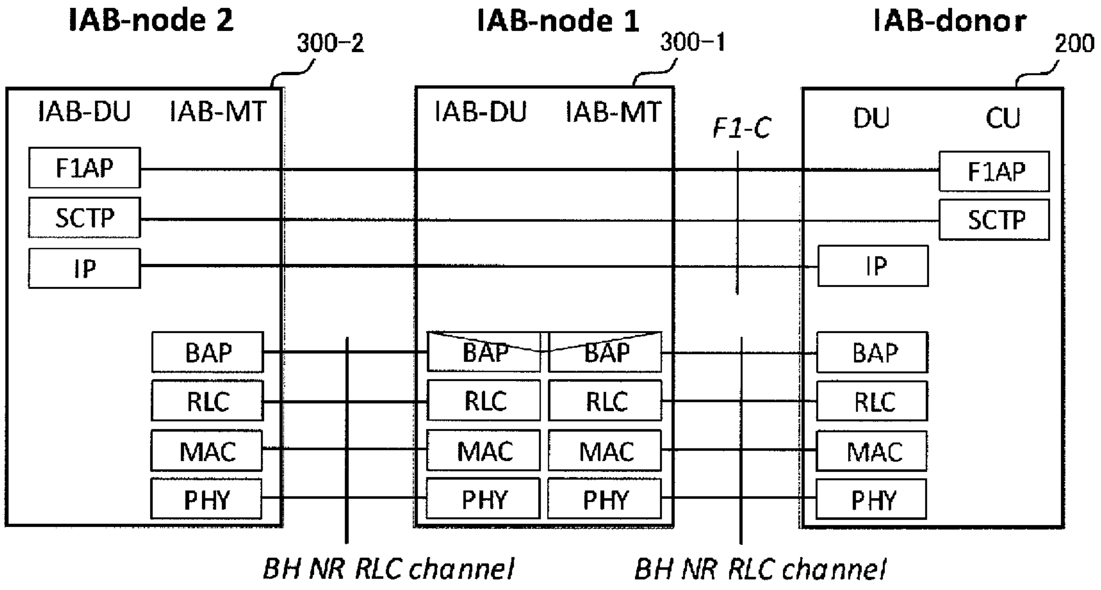
FIG. 8 is a diagram illustrating an example of a protocol stack related to an F1-C protocol according to an embodiment.

FIG. 7 is a diagram illustrating a protocol stack related to an F1-U protocol. FIG. 8 is a diagram illustrating a protocol stack related to an F1-C protocol. An example is illustrated in which the donor node 200 is divided into a CU and a DU.

As illustrated in FIG. 7, each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as a higher layer of the RLC layer. The BAP layer is a layer that performs routing processing and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring multiple backhaul RLC channels in each BH link enables the prioritization and Quality of Service (QoS) control of traffic. The association between the BAP PDU and the backhaul RLC channel is executed by the BAP layer of each IAB node 300 and the BAP layer of the donor node 200.

Note that the CU of the donor node 200 is a gNB-CU function of the donor node 200 that terminates the F1 interface to the IAB node 300 and the DU of the donor node 200. The DU of the donor node 200 is a gNB-DU function of the donor node 200 that hosts an IAB BAP sublayer and provides a wireless backhaul to the IAB node 300.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

A first embodiment will be described.

In the 3GPP, New Radio-Unlicensed (NR-U) is defined. NR-U is a technology for performing wireless communication using NR, which is a wireless communication standard in 5G, in an unlicensed band (for example, 5-GHz band) and/or a license shared band (or shared band). NR-U enables the combined use of the unlicensed band and the license shared band. As described above, in NR-U, wireless communication is performed using the unlicensed and/or license shared band, thus enabling an increase in network capacity.

On the other hand, the 3GPP has been studying Self-Organizing Network (SON)/Minimization of Drive Tests (MDT). SON is a technology for autonomously optimizing a network by collecting information from the UE 100 or the base station 200. MDT is a technology for improving a communication state by collecting information such as wireless communication disconnection from the UE 100. SON and MDT are common in that information in use is collected.

To be more specific, the 3GPP has been discussing reporting of the number of Listen Before Talk (LBT) failures and reporting of LBT statistical information.

Now, LBT will be described.

LBT

LBT is a technique in which the UE 100 or the base stations 200 senses (or Listens) to determine whether a channel to be used is free or busy before starting transmission and executes transmission when the channel is sensed to be free.

LBT is performed in an entity lower than a MAC entity and managed in the MAC entity. The lower entity performs an LBT procedure before transmission takes place. The lower entity outputs an LBT Failure Indication to the MAC entity when the transmission fails even though the LBT procedure has been executed.

Upon receiving the LBT failure indication from the lower layer, the MAC entity increments a counter (LBT-_COUNTER) by "1". When the count value is greater than or equal to the maximum value, the MAC entity triggers a consistent LBT failure in an active BandWidth Part (BWP). Then, upon triggering the consistent LBT failure for all the BWPs, the MAC entity indicates the consistent LBT failure to a higher layer. In this case, the UE 100 declares an RLF.

Configuration Example of First Embodiment

In a first embodiment, a description will be given of a configuration in which the IAB node 300 logs the number of successes and the failure rate of LBT in each of the uplink and the downlink and transmits the logged information to the donor node 200 as statistical information.

Specifically, first, a relay node (e.g., an IAB node) performs LBT. Then the relay node stores the number of successes and the failure rate for the LBT performed in the downlink direction, in the memory as statistical information, and stores the number of successes and the failure rate for the LBT performed in the uplink direction in the memory as statistical information. Then, the relay node transmits the statistical information to the upper node (for example, the donor node 200) of the relay node.

Since the upper node can acquire the number of successes and the failure rate of LBT separately for the uplink direction and the downlink direction, the upper node can execute predetermined processing for each of the uplink direction and the downlink direction. This enables the entire network formed by the IAB node 300 to be appropriately operated.

Figure 9:
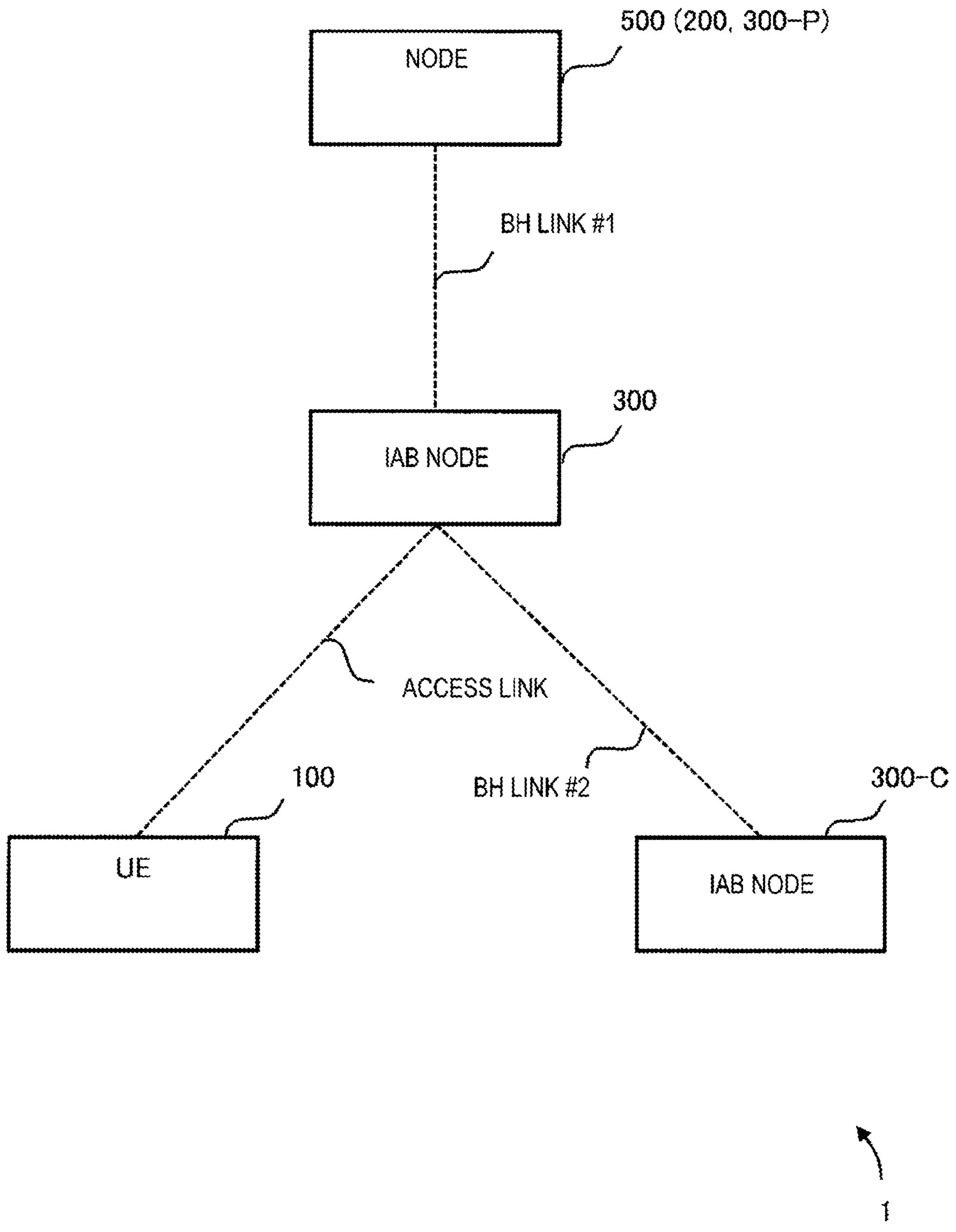
FIG. 9 is a diagram illustrating a configuration example of a cellular communication system according to a first embodiment.

FIG. 9 is a diagram illustrating a configuration example of a cellular communication system 1 according to the first embodiment. FIG. 9 illustrates a configuration example between the IAB nodes 300.

As illustrated in FIG. 9, the IAB node 300 includes the UE 100 and the IAB node 300-C as lower nodes. The IAB node 300 forms an access link with the UE 100. The IAB node 300 and the UE 100 exchange messages through the access link.

The IAB node 300 forms a backhaul link with the IAB node 300-C. In the relationship between the IAB node 300 and the IAB node 300-C, the IAB node 300 is a parent node and the IAB node 300-C is a child node. The IAB node 300 and the IAB node 300-C exchange messages through the backhaul link.

A node 500 is allocated at a higher level than the IAB node 300. The node 500 may be the donor node 200 that manages the IAB nodes 300 and 300-C and the UE 100. The node 500 may be a parent node (IAB node) of the IAB node 300. A backhaul link is also formed between the IAB node 300 and the node 500, and messages are exchanged through the backhaul link.

Operation Example of First Embodiment

Figure 10:
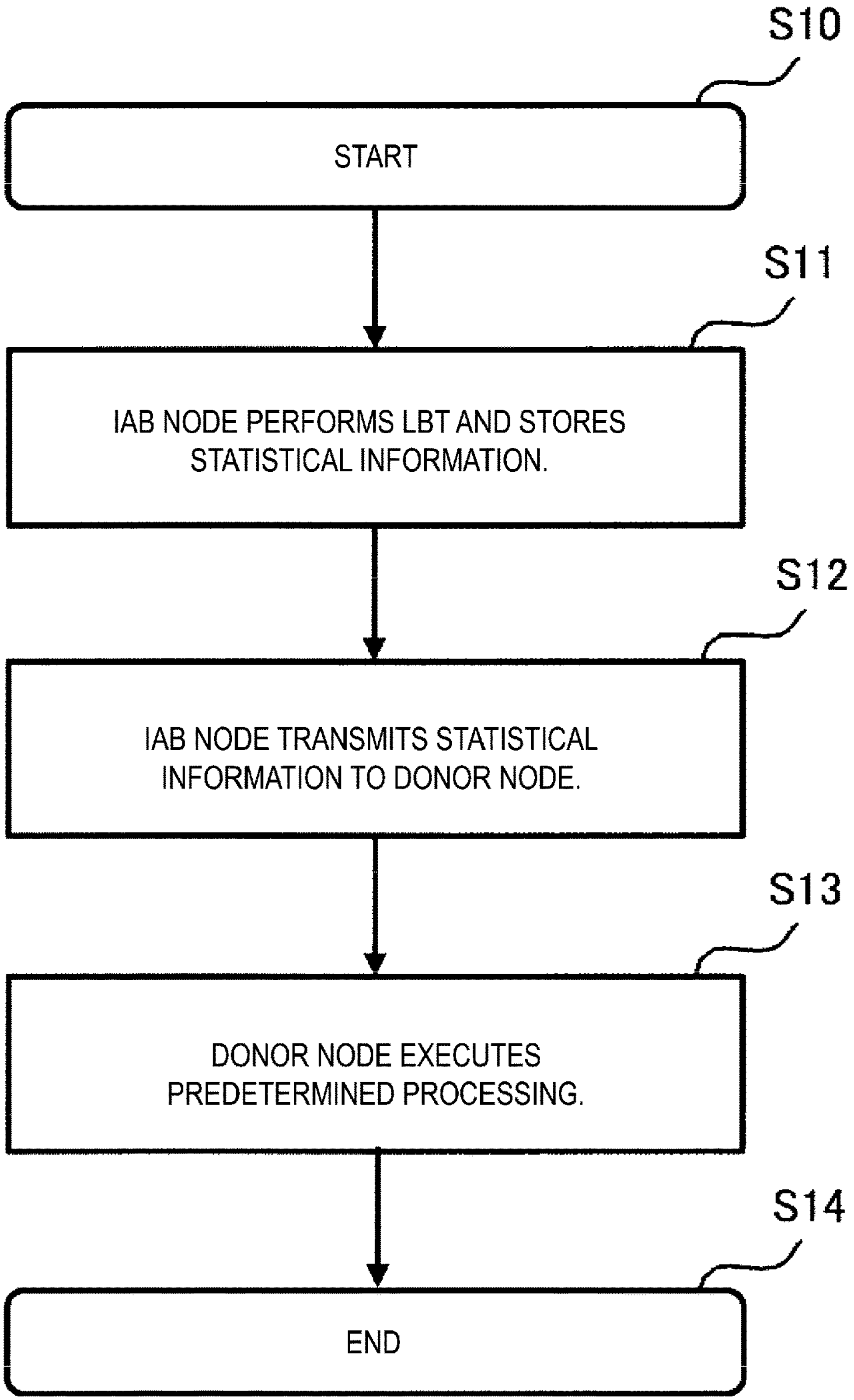
FIG. 10 is a flowchart illustrating an operation example according to the first embodiment.

FIG. 10 is a diagram illustrating an operation example according to the first embodiment.

However, FIG. 10 illustrates an example in which the IAB node 300 transmits statistical information to the donor node 200. For example, in this example, the UE 100 may transmit the statistical information to the IAB node 300 (or the donor node 200). For example, in this example, the IAB node 300 may transmit the statistical information to the parent node of the IAB node 300. In this example, the IAB node 300 may transmit the statistical information to the upper node of the IAB node. In this example, the UE 100 may transmit the statistical information to the gNB 200.

The IAB node 300-T starts processing in step S10 as illustrated in FIG. 10.

In step S11, the IAB node 300 performs LBT and stores (or logs) the statistical information in the memory. The IAB node 300 may perform LBT on NR-U.

The statistical information includes at least the number of LBT failures. The MAC entity of the IAB node 300 may use, as the number of LBT failures, a count value obtained by counting the LBT failure indication received from the lower entity.

The statistical information may include the number of LBT successes or the number of consistent LBT failures. The MAC entity of the IAB node 300 may use, as the number of LBT successes, a count value obtained by counting the LBT success indication received from the lower entity. The MAC entity of the IAB node 300 may use, as the number of consistent LBT failures, a value obtained by incrementing and counting the number of LBT failures when the MAC entity detects LBT failures for all BWPs.

The statistical information includes at least an LBT failure rate. The IAB node 300 may calculate the LBT failure rate using the following equation.

LBT failure rate=number of LBT failures/(number of LBT failures+number of LBT successes), or LBT failure rate=number of LBT failures/number of LBT attempts The IAB node 300 stores the calculated LBT failure rate in the memory as the statistical information.

Here, the IAB node 300 stores, in the memory, the statistical information in the uplink direction and the statistical information in the downlink direction. Note that the memory may be provided in the controller 320 of the IAB node 300. The memory may be inside the IAB node 300 and outside the controller 320.

In step S12, the IAB node 300 transmits the stored statistical information to the donor node 200. The IAB node 300 may transmit the statistical information to the donor node 200 in response to a query from the donor node 200.

In step S13, the donor node 200 may perform predetermined processing on the IAB node 300 based on the received statistical information. The predetermined processing may be a change in an LBT-related configuration. The change in the LBT-related configuration may be, for example, a change in the maximum value for triggering the consistent LBT failure. The predetermined processing may be a change in scheduling in the downlink direction. Such a change includes, for example, a change in at least one selected from the group consisting of the time, frequency, and resource blocks used in scheduling in the downlink direction. The predetermined processing may be a change in scheduling in the uplink direction. Such a change includes, for example, a change in at least one selected from the group consisting of the time, frequency, and resource blocks used in scheduling in the uplink direction. The predetermined processing may be a handover. The predetermined processing may be a change in a handover parameter. The predetermined processing may be a change in a routing table. Such a change includes, for example, identification of a congested route and a change in traffic volume or balance.

Then, the donor node 200 ends the series of processing operations.

Second Embodiment

A second embodiment will be described.

RLF-Report

The 3GPP defines RLF-Report. Specifically, when predetermined statistical information (or cause) related to a Radio Link Failure (RLF) is produced, the UE 100 stores the RLF in varRLF-Report. The cause may be a random access problem, the number of retransmissions in the RLC layer reaching a maximum number, an LBT failure, a backhaul RLF recovery failure, or the like. The UE 100 also stores the cause in varRLF-Report.

When a predetermined cause related to a Handover Failure (HOF) occurs, the UE 100 stores the HOF in varRLF-Report. The cause may be a synchronization reconfiguration failure (Reconfiguration with sync Failure) or the like. The UE 100 also stores the cause in varRLF-Report.

Then, the UE 100 sets, in RLF-Report, the information stored in varRLF-Report, and transmits a UE Information Response message including RLF-Report to the network. After the RLF or HOF, the UE 100 transmits, to a Reestablished cell, a UE Information Response message including RLF-Report.

However, consider a case where varRLF-Report includes an RLF due to an LBT failure and an RLF or HOF due to another cause, and where the UE 100 transmits RLF-Report after the RLF or HOF. In such a case, for RLF-Report transmitted by the UE 100 after the RLF or the HOF, the base station 200 having received RLF-Report does not know whether the RLF or the HOF is due to the LBT failure or due to another cause.

In the second embodiment, the IAB node 300 transmits RLF-Report to the donor node 200 when a predetermined event occurs due to the LBT failure. On the other hand, the IAB node 300 does not transmit RLF-Report to the donor node 200 when a predetermined event occurs due to a cause other than the LBT failure.

Specifically, the relay node (e.g., the IAB node 300) performs LBT and stores statistical information in the memory. Subsequently, the relay node detects a predetermined event. Subsequently, when the predetermined event is caused by the LBT failure corresponding to the statistical information, the relay node transmits a first RLF report to the upper node of the relay node. On the other hand, when the predetermined event is caused by the statistical information other than the LBT failure, the relay node does not transmit the first RLF report to the upper node.

Thus, the upper node can recognize that the predetermined event is caused by the LBT failure.

Operation Example of Second Embodiment

Figure 11:
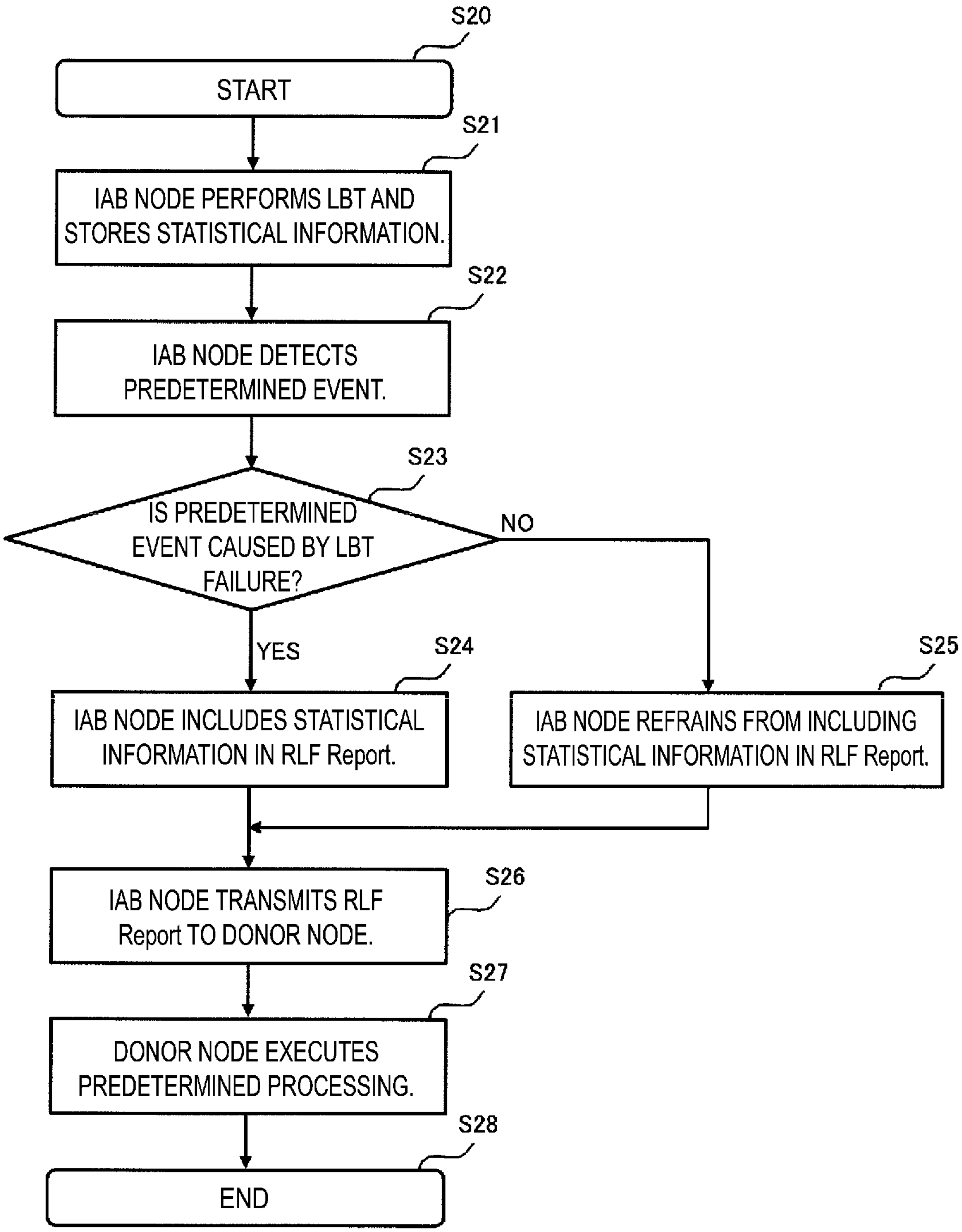
FIG. 11 is a flowchart illustrating an operation example according to a second embodiment.

FIG. 11 is a diagram illustrating an operation example according to the second embodiment. The operation example illustrated in FIG. 11 also describes an operation example between the IAB node 300 and the donor node 200. The operation example illustrated in FIG. 11 may be, for example, an operation example between the UE 100 and the IAB node 300 (or the donor node 200), between the IAB node 300 and the parent node of the IAB node 300, and/or between the IAB node 300 and the upper node of the IAB node 300. The operation example illustrated in FIG. 11 may be an operation example between the UE 100 and the gNB 200.

The IAB node 300-T starts processing in step S20 as illustrated in FIG. 11.

In step S21, the IAB node 300 performs LBT and stores statistical information in the memory. The IAB node 300 may perform LBT on the unlicensed band and/or the license shared band (or the shared band). The content of the statistical information and the acquisition method for the statistical information may be the same as those in the first embodiment. The statistical information may include the random access problem, the number of retransmissions in the RLC layer reaching the maximum number, the LBT failure, the backhaul RLF recovery failure, and the synchronization Reconfiguration failure. The statistical information may include a radio state (Reference Signal Received Power (RSRP), Reference Signal Received Quality (RSRQ), Signal to Interference and Noise Ratio (SINR), and the like), position information (latitude, longitude, altitude, and the like), and information regarding the connected cell (cell ID and the like). The IAB-MT of the IAB node 300 may detect and store these pieces of statistical information in the memory.

In step S22, the IAB node 300 detects a predetermined event. The predetermined event is an RLF or HOF. For example, the IAB-MT of the IAB node 300 may detect the RLF by detecting the random access problem, the number of retransmissions in the RLC layer reaching the maximum number, the LBT failure, the backhaul RLF recovery failure, or the like. For example, the IAB-MT of the IAB node 300 may detect the HOF by detecting the synchronization reconfiguration failure. The IAB node 300 may detect the RLF or HOF in a known manner. The IAB node 300 may clear the statistical information stored in step S21.

In step S23, the IAB node 300 determines whether the predetermined event is caused by the LBT failure corresponding to the statistical information. For example, upon detecting the RLF or HOF immediately after the LBT failure, the IAB node 300 may determine that the RLF or HOF is caused by the statistical information indicating the LBT failure, and otherwise may determine that the RLF or HOF is not caused by the LBT failure.

In step S23, upon determining that the predetermined event is caused by the LBT failure (YES in step S23), the IAB node 300 transitions to step S24. On the other hand, in step S23, upon determining that the predetermined event is not caused by the LBT failure (NO in step S23), the IAB node 300 transitions to step S25.

In step S24, the IAB node 300 includes the statistical information in RLF-Report. In other words, the IAB node 300 includes, in RLF-Report, the statistical information indicating the LBT failure. In this case, the IAB node 300 refrains from including, in RLF-Report, other statistical information not related to the RLF and the HOF. Specifically, the IAB node 300 may clear the (past) statistical information stored in varRLF-Report, store, in varRLF-Report, the statistical information (here, the LBT failure) related to the RLF or HOF, include varRLF-Report in RLF-Report at a predetermined timing, and transmit RLF-Report.

On the other hand, in step S25, the IAB node 300 refrains from including the statistical information in RLF-Report. In other words, the IAB node 300 does not transmit RLF-Report to the donor node 200 by refraining from including the statistical information in RLF-Report except for the event caused by the LBT failure. In this case, the IAB node 300 may include, in RLF-Report, other statistical information related to the RLF or the HOF and transmit RLF-Report, as in the case of the known art.

In step S26, the IAB node 300 transmits RLF-Report to the donor node 200. In other words, the IAB node 300 transmits, to the donor node 200, RLF-Report including the event due to the LBT failure and the statistical information indicating the LBT failure that is the cause of occurrence of the event.

In step S27, the donor node 200 may perform predetermined processing in response to reception of RLF-Report. The predetermined processing may be the same as, and/or similar to, the predetermined processing in the first embodiment.

Then, in step S28, the donor node 200 ends the series of processing operations.

Variation of Second Embodiment

A variation of the second embodiment will be described. In the second embodiment, an example has been described in which, when an RLF or HOF occurs, the IAB node 300 includes, in RLF-Report, statistical information (LBT failure) related to the RLF or the HOF and transmits RLF-Report and refrains from transmitting statistical information not related to the RLF or the HOF. In a variation, an example will be described in which the IAB node 300 also transmits statistical information not related to the RLF and HOF.

To be more specific, when the predetermined event is caused by the statistical information other than the LBT failure, the relay node (e.g., the IAB node 300) includes association information associating the statistical information with the predetermined event, in a second RLF report together with the statistical information and the predetermined event, and transmits the second RLF report to the upper node (e.g., the donor node 200).

Thus, the upper node can recognize the statistical information stored in the relay node.

Operation Example of Variation

An operation example of the variation will be described.

Figure 12:
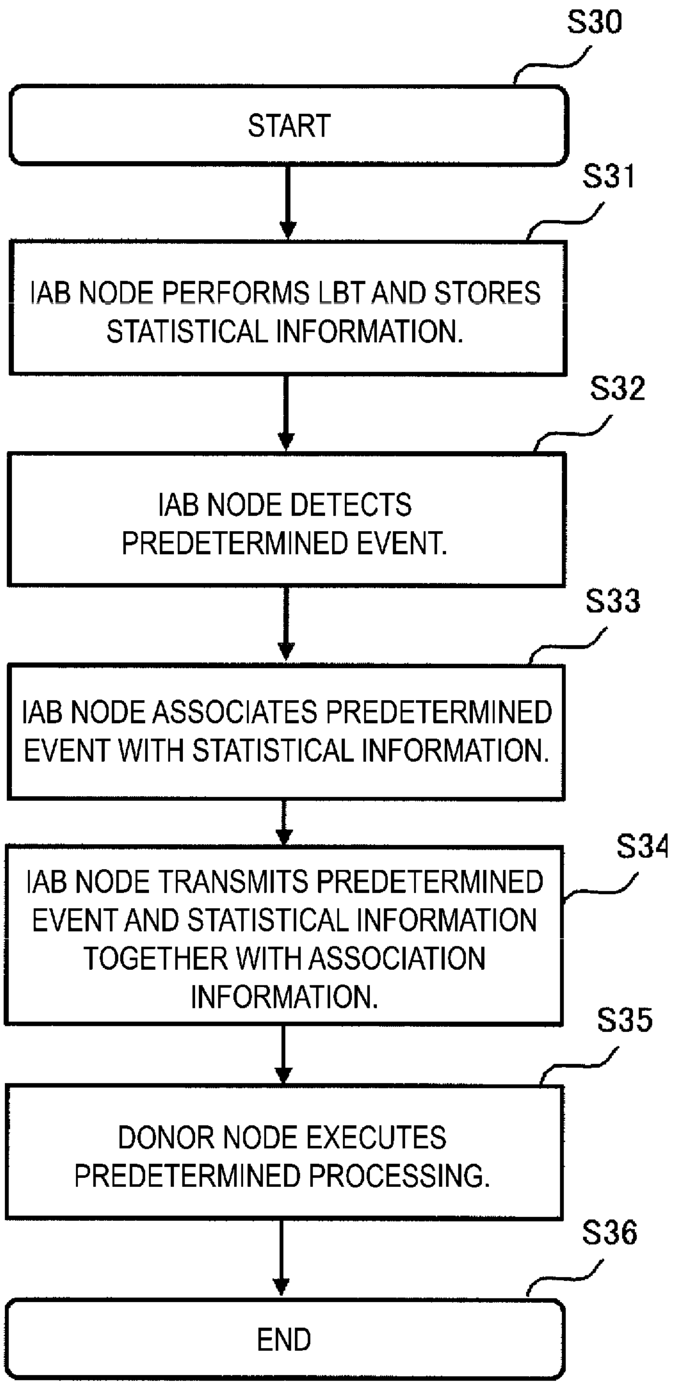
FIG. 12 is a flowchart illustrating an operation example according to a variation of the second embodiment.

FIG. 12 is a flowchart illustrating an operation example according to the variation. For the variation, an operation example between the IAB node 300 and the donor node 200 will be described, but an operation example between the UE 100 and the IAB node 300 (or the donor node 200) may be employed. An operation example between the IAB node 300 and the parent node of the IAB node 300 and/or between the IAB node 300 and the upper node of the IAB node 300 may be employed. An operation example between the UE 100 and the gNB 200 may be employed.

As illustrated in FIG. 12, steps S30 to S32 are respectively the same as steps S20 to S22 (FIG. 11) in the second embodiment.

In step S33, the IAB node 300 associates the predetermined event with the statistical information. For example, upon detecting an RLF or an HOF immediately after the stored statistical information, the IAB node 300 associates the statistical information with the RLF or the HOF.

Here, the IAB node 300 generates association information indicating the association. The association information may be identification information. In this case, first identification information corresponds to the RLF, and second identification information corresponds to the HOF. When associating first statistical information with the RLF, the IAB node 300 assigns the first identification information to the first statistical information. When associating second statistical information with the HOF, the IAB node 300 assigns the second identification information to the second statistical information. The association method may be either one of the RLF and HOF or may be both (two). Statistical information not associated with the RLF and the HOF need not include the association information.

In step S34, the IAB node 300 transmits the statistical information and the predetermined event to the donor node 200 together with the association information. The IAB node 300 may transmit RLF-Report including the statistical information and the predetermined event together with the association information.

In step S35, the donor node 200 may perform predetermined processing on the IAB node 300 in response to receiving the association information, the statistical information, and the predetermined event. The predetermined processing may be the same as, and/or similar to, the predetermined processing in the first embodiment.

OTHER EMBODIMENTS

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or a System on a chip (SoC)).

The phrases “based on” and “depending on” used in the present disclosure do not mean “based only on” and “only depending on,” unless specifically stated otherwise. The phrase “based on” means both “based only on” and “based at least in part on”. Similarly, the phrase “depending on” means both “only depending on” and “at least partially depending on”. “Obtain” or “acquire” may mean to obtain information from stored information, may mean to obtain information from information received from another node, or may mean to obtain information by generating the information. The terms “include”, “comprise” and variations thereof do not mean “include only items stated” but instead mean “may include only items stated” or “may include not only the items stated but also other items”. The term “or” used in the present disclosure is not intended to be “exclusive or”. Any references to elements using designations such as “first” and “second” as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as “a,” “an,” and “the” are added in the present disclosure through translation, these articles include the plural unless clearly indicated otherwise in context.

Although embodiments have been described in detail with reference to the drawings, a specific configuration is not limited to those described above, and various design changes and the like can be made without departing from the scope of the present disclosure. All of or a part of the embodiments can be combined together as long as no inconsistencies are introduced.

REFERENCE SIGNS

1: Mobile communication system
10: 5GC
11: AMF
100: UE
110: Wireless communicator
120: Controller
200 (200-1, 200-2): gNB (donor node)
210: Wireless communicator
220: Network communicator
230: Controller
300: IAB Node
310: Wireless communicator
320: Controller

The invention claimed is:

1. A communication control method used in a cellular communication system, the communication control method comprising:
performing, by a user equipment, Listen Before Talk (LBT) on a shared spectrum; and
transmitting to a base station, by the user equipment, a report including information indicating the number of LBT failures and information regarding to a radio state between the user equipment and the base station,
wherein
the LBT is performed by a lower entity in the user equipment, and
the information indicating the number of LBT failures is based on the number of LBT failure indications received by an entity higher than the lower entity from the lower entity.

2. The communication control method according to claim 1, wherein
the transmitting includes transmitting, by the user equipment, to the base station the report including information indicating consistent LBT failure as cause information.

3. The communication control method according to claim 1, wherein
the transmitting includes transmitting, the user equipment, to the base station the report including the information in response to the occurrence of RLF (Radio Link Failure) or HOF (Handover Failure) due to the LBT failure and transmitting to the base station the report not including the information in response to the occurrence of RLF or HOF not due to the LBT failure.

4. A cellular communication system comprising:
a user equipment; and
a base station, wherein
the user equipment performs LBT (Listen Before Talk) on a shared spectrum, the use equipment transmits to a base station, a report including information indicating the number of LBT failures and information regarding to a radio state between the user equipment and the base station, wherein the LBT is performed by a lower entity in the user equipment, and the information indicating the number of LBT failures is based on the number of LBT failure indications received by an entity higher than the lower entity from the lower entity.

5. The cellular communication system according to claim 4, wherein the user equipment transmits to the base station the report including information indicating consistent LBT failure as cause information.

6. The cellular communication system according to claim 4, wherein the user equipment transmits to the base station the report including the information in response to the occurrence of RLF (Radio Link Failure) or HOF (Handover Failure) due to the LBT failure and transmits to the base station the report not including the information in response to the occurrence of RLF or HOF not due to the LBT failure.

7. A user equipment comprising a transceiver circuitry and a processing circuitry operatively associated with the transceiver circuitry and configured to execute processes of:

performing Listen Before Talk (LBT) on a shared spectrum;

transmitting a report including information indicating the number of LBT failures and information regarding to a radio state between the user equipment and the base station, wherein the LBT is performed by a lower entity in the user equipment, and the information indicating the number of LBT failures is based on the number of LBT failure indications received by an entity higher than the lower entity from the lower entity.

8. The user equipment according to claim 7, wherein the transceiver circuitry is configured to execute process of transmitting to the base station the report including information indicating consistent LBT failure as cause information.

9. The user equipment according to claim 7, wherein the transceiver circuitry is configured to execute processes of transmitting to the base station the report including the information in response to the occurrence of RLF (Radio Link Failure) or HOF (Handover Failure) due to the LBT failure and transmitting to the base station the report not including the information in response to the occurrence of RLF or HOF not due to the LBT failure.

10. A non-transitory computer-readable storage medium storing a program for causing a computer to execute processing comprising:

performing Listen Before Talk (LBT) on a shared spectrum;

transmitting to a base station, a report including information indicating the number of LBT failures and information regarding to a radio state between the user equipment and the base station, wherein the LBT is performed by a lower entity in the user equipment, and the information indicating the number of LBT failures is based on the number of LBT failure indications received by an entity higher than the lower entity from the lower entity.

11. The non-transitory computer-readable storage medium according to claim 10, wherein the transmitting include transmitting to the base station the report including information indicating consistent LBT failure as cause information.

12. The non-transitory computer-readable storage medium according to claim 10, wherein the transmitting includes transmitting to the base station the report including the information in response to the occurrence of RLF (Radio Link Failure) or HOF (Handover Failure) due to the LBT failure and transmitting to the base station the report not including the information in response to the occurrence of RLF or HOF not due to the LBT failure.

13. A chipset for a user equipment in a cellular communication system, the chipset comprising:

performing Listen Before Talk (LBT) on a shared spectrum; and transmitting to a base station, a report including information indicating the number of LBT failures and information regarding to a radio state between the user equipment and the base station, wherein the LBT is performed by a lower entity in the user equipment, and the information indicating the number of LBT failures is based on the number of LBT failure indications received by an entity higher than the lower entity from the lower entity.

14. The chipset according to claim 13, wherein the transmitting include transmitting to the base station the report including information indicating consistent LBT failure as cause information.

15. The chipset according to claim 13, wherein the transmitting includes transmitting to the base station the report including the information in response to the occurrence of RLF (Radio Link Failure) or HOF (Handover Failure) due to the LBT failure and transmitting to the base station the report not including the information in response to the occurrence of RLF or HOF not due to the LBT failure.

* * * * *